(12) United States Patent
Pelz et al.

(10) Patent No.: US 6,357,772 B1
(45) Date of Patent: Mar. 19, 2002

(54) REAR WHEEL SUSPENSION AND SUBFRAME FOR THE FRONT OR REAR WHEEL SUSPENSION OF A MOTOR VEHICLE

(75) Inventors: Gerhard Pelz, Welgesheim; Peter Denk, Gross-Gerau, both of (DE); Gunnar Olsson, Trollhättan (SE); Rudolf Schmidt, Rüsselsheim (DE)

(73) Assignee: Adam OpeiAG, Russelsheim (DE)

( * ) Notice: Subject to any disclaimer, the term of this patent is extended or adjusted under 35 U.S.C. 154(b) by 0 days.

(21) Appl. No.: 09/380,140

(22) PCT Filed: Feb. 27, 1998

(86) PCT No.: PCT/DE98/00574

§ 371 Date: Nov. 17, 1999

§ 102(e) Date: Nov. 17, 1999

(87) PCT Pub. No.: WO98/38055

PCT Pub. Date: Sep. 3, 1998

(30) Foreign Application Priority Data

Mar. 1, 1997 (DE) .......................................... 197 08 422
Mar. 1, 1997 (DE) .......................................... 197 08 421

(51) Int. Cl.[7] ................................................ B60G 7/00
(52) U.S. Cl. ........................ 280/124.143; 280/124.135
(58) Field of Search .................... 280/124.134, 124.133, 280/124.135, 124.136, 124.138, 124.139, 124.141, 124.143, 124.144, 124.145, 124.148

(56) References Cited

U.S. PATENT DOCUMENTS

| | | | | |
|---|---|---|---|---|
| 4,671,531 A | * | 6/1987 | Sautter et al. | 280/124.143 |
| 4,840,396 A | | 6/1989 | Kubo | 280/690 |
| 4,903,981 A | * | 2/1990 | Alesso et al. | 280/124.143 |
| 4,973,075 A | * | 11/1990 | Rori et al. | 280/124.143 |
| 4,989,894 A | | 2/1991 | Winsor et al. | 280/690 |
| 5,560,638 A | * | 10/1996 | Lee | 280/124.143 |
| 5,704,632 A | * | 1/1998 | Lee | 280/124.143 |
| 5,851,016 A | * | 12/1998 | Kawagoe et al. | 280/124.148 |
| 6,224,046 B1 | * | 5/2001 | Miyamoto | 280/124.148 |

FOREIGN PATENT DOCUMENTS

| | | |
|---|---|---|
| DE | 3048794 | 8/1982 |
| DE | 3434790 | 4/1985 |
| DE | 3942794 | 7/1991 |
| EP | 0182480 | 5/1986 |
| EP | 0193847 | 9/1986 |
| EP | 0277650 | 8/1988 |
| EP | 0307547 | 3/1989 |
| FR | 2674187 | 9/1992 |
| JP | 110506 | * 5/1987 |
| JP | 02 225184 | 9/1990 |
| WO | 96/00661 | 1/1996 |
| WO | 96/32312 | 10/1996 |

\* cited by examiner

Primary Examiner—Brian L. Johnson
Assistant Examiner—Bryan Fischmann
(74) Attorney, Agent, or Firm—Laura C. Hargitt

(57) ABSTRACT

A flat four-link rear axle with favorable dynamic properties is presented. The essential aspect lies in that the lower transverse control arm (1), the upper transverse control arm (2) and a compensating control arm (3) are arranged one behind the other (in the direction of travel), so that a spring (15) for supporting the wheel suspension on the body can be supported on the lower transverse control arm (1). The space created by shifting the transverse control arms makes it possible to use a barrel spring with progressive spring characteristic. The associated shock absorber (16) is arranged between the upper transverse control arm (2) and the compensating control arm (3), and its lower fixing eye (26) is mounted in the lower region of the axle carrier (4) so that the upper end of the shock absorber does not extend very far beyond the upper transverse control arm (2) compared with known solutions. This makes it possible to attach the shock absorber (16) to the lower side of the boot floor, which thus acquires a large width for loading wide objects. Moreover an auxiliary frame for such a rear wheel suspension is presented.

6 Claims, 2 Drawing Sheets

REAR WHEEL SUSPENSION AND SUBFRAME FOR THE FRONT OR REAR WHEEL SUSPENSION OF A MOTOR VEHICLE

TECHNICAL FIELD

The invention relates first to a rear wheel suspension for a motor vehicle with an upper and a lower transverse control arm, a transversely arranged compensating control arm and a longitudinal control arm for multiple linking of an axle carrier to the vehicle body, with a body support consisting of a spring and a shock absorber, the lower fixing eye of the shock absorber being mounted directly on the axle carrier.

BACKGROUND OF THE INVENTION

A rear wheel suspension of this kind is described in German Patent DE 34 34 790 A1. The body is here supported by means of a spring/shock absorber strut, that is, a combination of a shock absorber and a spring, the spring being supported at the bottom on the outer tube of the shock absorber. The lower fixing eye of the shock absorber is mounted on the axle carrier at the level of the wheel axis (see e.g. FIG. 2 of the application published without examination). This layout has inter alia the disadvantage that the spring/shock absorber strut protrudes very high, requiring additional packaging space which must be made available by reducing space in the wheel opening area or trunk of the vehicle.

Moreover the fixing eye is located near the pivot axis about which the axle carrier is pivoted in relation to the body during inward deflection. This causes poor transmission of force or stroke, particularly for the spring.

SUMMARY OF THE INVENTION

The invention is therefore based on the objective of providing a flat rear wheel suspension of the kind mentioned, which furthermore delivers favorable performance.

To achieve the objective it is proposed that the upper transverse control arm, referred to the direction of travel, is located in front of the lower transverse control arm and the spring is supported on the lower transverse control arm near the axle carrier. Hence the first achievement is that the bottom support of the spring is set far down, so that the top support, taking into account the spring travel which must necessarily be provided, can be arranged below the wheel opening housing or trunk floor.

By shifting the upper control arm relative to the lower control arm, secondly enough clearance space is created for the spring, so that e.g. a short barrel spring with progressive spring characteristic (miniblock spring) can be used. The arrangement further ensures that enough fitting space is left to be able to attach the caliper of a disc brake in the rear angle region of the axle carrier.

The chosen arrangement further has the advantage that the stroke path for the spring can be kept close to optimum, as the wheel contact point of the wheel held on the axle carrier and the spring support are approximately the same distance away from the pivot axis of the wheel suspension on the body.

In order to be able to arrange the upper link point of the shock absorber as low as possible and so be able to provide a load space floor continuing as far as the wheel housing, it is proposed to provide the lower link point to the axle carrier at the level of the link point for the lower cross member. At the same time the shock absorber can be arranged close to the axle carrier so that the load space, if its floor runs below the upper link point of the shock absorber, has to be only slightly restricted laterally.

For the kinematics of the wheel suspension it is advantageous if the lower transverse control arm is located behind the axis of rotation in the axle carrier and the upper transverse control arm is located more or less above the axis of rotation in the axle carrier. In this way the position of the pivot axis, which is determined inter alia by an imaginary central link of the transverse control arms on the body side, can be adapted better to the respective circumstances of the vehicle.

Preferably the shock absorber is arranged between the compensating control arm and the upper transverse control arm.

The transverse control arms and the compensating control arm are linked to an auxiliary frame on the body side. This auxiliary frame is attached to the body by four points of attachment. On one side of the vehicle, on the auxiliary frame are arranged in each case two points of attachment one behind the other and approximately halfway between the axle carrier and the link of the upper transverse control arm. The link of the compensating control arm to the auxiliary frame on the body side is approximately below the front attachment of the auxiliary frame to the body.

The arrangement of the wheel suspension on the auxiliary frame described has the advantage that the wheel suspension can be largely preassembled and attached together with the auxiliary frame to the body. A separate operation is necessary only for the link of the longitudinal control arm on the body side.

The invention further relates to an auxiliary frame for the front or rear wheel suspension of a motor vehicle, which is held on the vehicle body at at least four points of attachment, each wheel of the axle being linked to the auxiliary frame by at least one control arm, consisting of four arms which project from and are attached to a central body on each side of the vehicle in pairs and which at their free ends are attached to the vehicle body. An auxiliary frame of this kind is described in German Patent DE 39 42 794 A1. The arms are individually attached to a central body and form a cross in plan view. The free ends of the arms are attached to two longitudinal members of the vehicle body. The cross forms a reinforcement with which an increase in transverse rigidity is to be achieved. The cross prevents the two longitudinal members from being displaced laterally under load, but not from moving into a skewed position relative to each other. Torsion of the auxiliary frame about a transverse axis of the vehicle thus cannot be avoided with this arrangement, as the arms are in each case attached to each other centrally.

From German Patent DE 41 35 361 A1 is known another auxiliary frame in which the two front arms and the two rear arms each form a component which is made from two half-shells. The two double arms are joined together by two short tubes, so that an approximately rectangular frame is formed. The two tubes are passed through the hollow bodies and welded to them. This auxiliary frame is of course more torsionally rigid than the auxiliary frame according to German Patent DE 39 42 794 A1, but is more complicated to manufacture.

The invention is therefore based on the objective of developing a torsionally rigid auxiliary frame which is easy to make and also as flat as possible.

For this it is proposed that the two arms of one pair, that is, the two arms which point towards one side of the vehicle, form partial sections of a U-shaped double arm which is attached by its curved section to the central body.

In particular when the central body is a box open on both sides, with the curved section of a double arm entering the lateral openings, the result is a torsionally rigid arrangement which is also easy to manufacture. The box structure of the central body alone already ensures torsional rigidity, which is increased by the fact that the curved sections of the double arm enter the side openings and are preferably welded there.

The torsional rigidity can be increased if the box has the form of an elongate cuboid which is closed in cross-section. To facilitate assembly of the curved sections, the lateral openings are funnel-shaped.

The double arms are preferably formed from a tube which by means of a bending machine can easily be changed to the shape intended for the vehicle. A particularly good joint between the tube and the box is obtained if the height of the box corresponds to the tube thickness and the tube over the whole length of its bottom enters the opening as far as the tube axis. The upper and lower edges of the box then extend tangentially into the lateral surface of the tube, so that the two parts can be welded together without stress.

The arms are freed from control arm forces if the wheel control arms are linked directly to the central body. In particular with a double transverse control arm with upper and lower control arms, the bearing blocks for receiving the link can be arranged on the upper side and on the lower side of the central body.

It is possible to attach the bearing blocks not as component parts to the central body, but to form the bearing blocks integrally directly on the central body. Mountings for a stabilizer can also be provided on the central body.

As the construction of the auxiliary frame ensures sufficient rigidity independently of the material used, it can be made of light metal, e.g. aluminium. This has the advantage that the auxiliary frame exhibits sufficient rigidity and yet is relatively light.

BRIEF DESCRIPTION OF THE DRAWINGS

The invention will be described in more detail below with the aid of a practical example which is shown in three drawings. They show.

DESCRIPTION OF THE PREFERRED EMBODIMENTS

Figure 2:
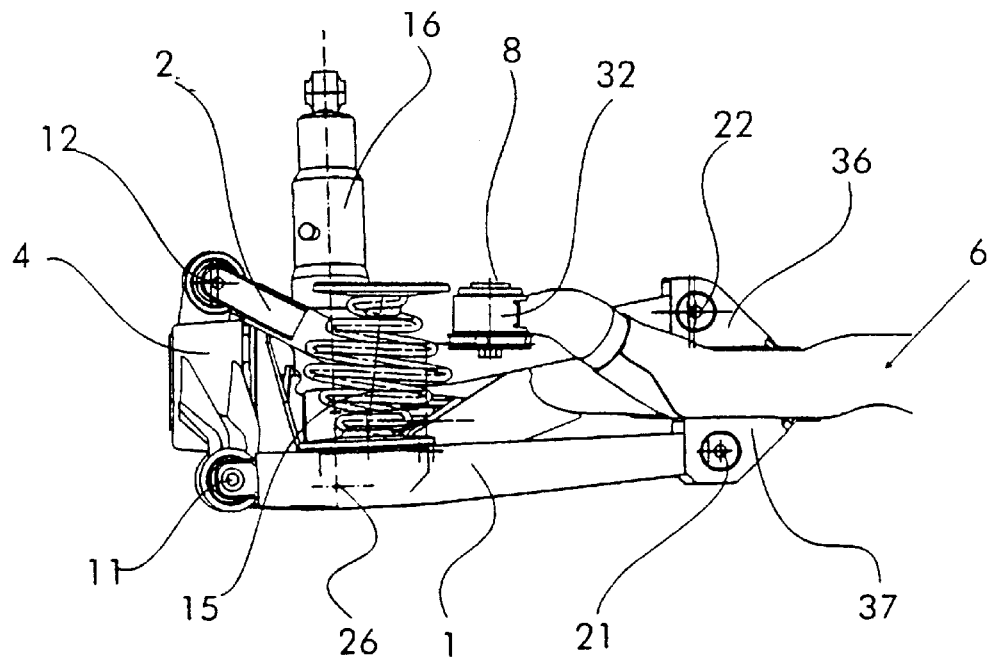
FIG. 2 a rear view of the wheel suspension with parts of the auxiliary frame, and FIG. 3 a perspective view of a rear axle with auxiliary frame.

The wheel suspension consists of a lower transverse control arm 1, an upper transverse control arm 2 as well as a transversely arranged compensating control arm 3 and a longitudinal control arm 9. The three transversely arranged control arms extend parallel to each other and more or less parallel to the horizontal of the vehicle. The link points 11, 12, 13 of the control arms on the axle carrier 4 form approximately an equilateral triangle, the link 12 of the upper transverse control arm 2 being above the wheel axis 5 and the links 11, 13 of the lower transverse control arm 1 and compensating control arm 3 being below it on both sides of the wheel axis 5 of the axle carrier 4.

On the body side the transverse control arms are attached to an auxiliary frame 6 which will be described in more detail below. The latter is attached to the body floor by four points of attachment 7, 8; 7', 8', two on each side of the vehicle.

The lower transverse control arm 1 and the upper transverse control arm 2 are linked to the upper and lower sides of the auxiliary frame 6 so as to be inwardly offset from the points of attachment 7, 8 (links 21, 22). The link 23 of the compensating control arm 3 on the body side is approximately below the front point of attachment 7.

The points of attachment 7, 8 are located approximately one behind the other halfway across the width between the axle carrier and the links 21, 22 of the lower transverse control arm 1 and upper transverse control arm 2 on the body side. The lower and upper transverse control arms 1, 2 are mounted on both sides each in damping bushings oriented lengthways to the longitudinal axis of the vehicle. The rubber-like material in the bushings ensures firstly structure-borne sound insulation and secondly a certain flexibility of the link, so that the axle carrier 4 can pivot through a three-dimensional curve whose position in relation to the body is determined in particular by the compensating control arm 3 and a longitudinal control arm 9 in cooperation with the transverse control arms 1, 2.

The longitudinal control arm 9 is a sword-like torsionally soft metal sheet which is oriented vertically to the vehicle and so allows bending in the horizontal plane, but not in the vertical plane. It has in particular the object of controlling the castor of the rear wheel during inward deflection. The longitudinal control arm 9 is rigidly connected to the axle carrier 4 and mounted on the body so as to be pivotable perpendicularly to the longitudinal axis of the vehicle.

By contrast the compensating control arm 3 has the object of controlling the camber during inward deflection. For this, the compensating control arm 3 is mounted in a ball joint on the axle carrier side and in a damping bushing on the body side.

The wheel suspension is supported by means of a spring 15 and a shock absorber 16. The spring 15 rests on a spring plate 17 on the lower transverse control arm near the link 21 on the axle carrier side. The upper transverse control arm 2 extends in front of the space occupied by the spring.

A barrel spring with progressive characteristic is provided as the spring 15. The spring is relatively short and does not protrude much beyond the rear point of attachment 8. The shock absorber 16 is provided near the axle carrier 4 between the upper transverse control arm 2 and the compensating control arm 3. The lower fixing eye 26 is located at the same level as the link point 11 of the lower cross member 1 on the axle carrier side.

In the region of the shock absorber 16 the end of the longitudinal member 9 on the axle carrier side is also attached to the axle carrier 4.

The pivot axis 25 determines inward deflection of the axle carrier 4 or of the vehicle wheel attached thereto. The pivot axis 25 passes, at least for short spring strokes, through a central link point 20 defined by the links 21, 22 on the body side for the upper and lower transverse control arms 1, 2 as well as the link 23 on the body side for the compensating control arm 3. As can easily be detected, the distances from the spring support and the central wheel contact point 24 to the pivot axis 25 are not very different from each other, so that there is almost optimum stroke transmission for inward deflection. An arrangement of the spring coaxially with the shock absorber—as proposed in the state of the art—would deflect less favorably.

Figure 1:
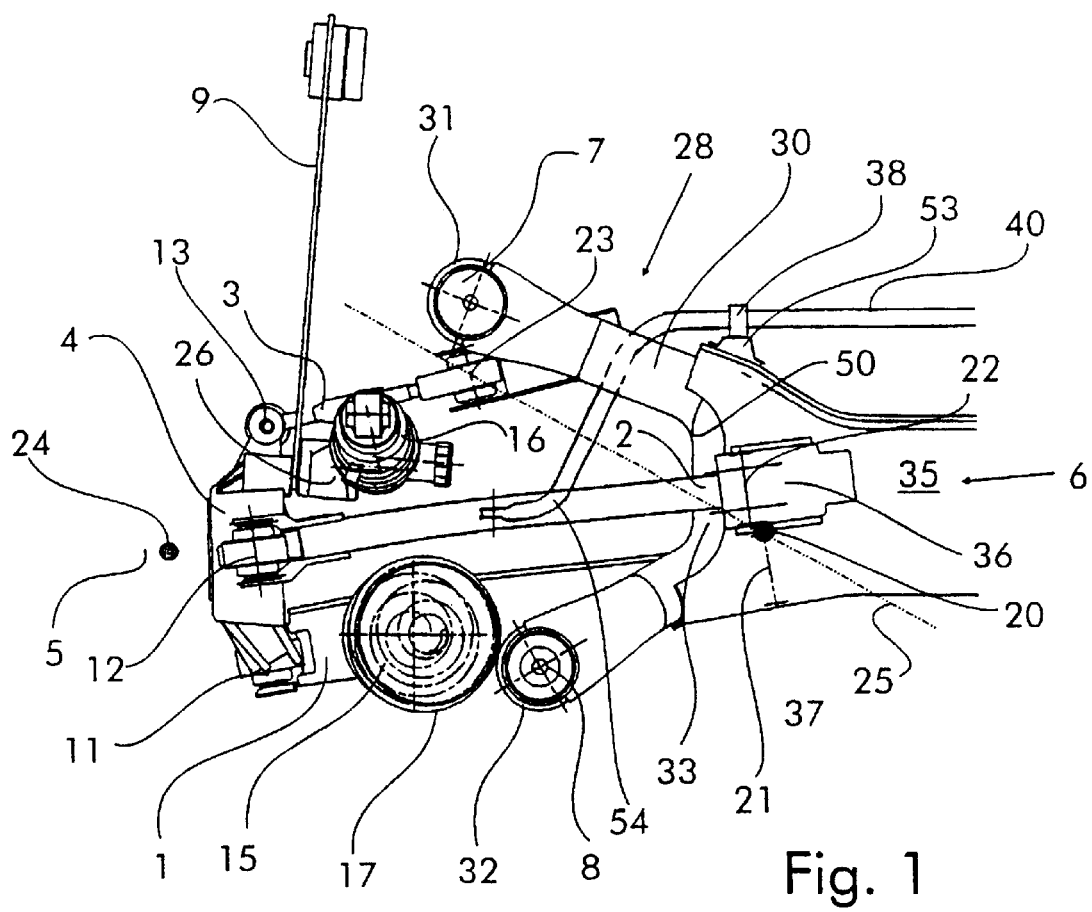
FIG. 1 a top view.
Figure 3:
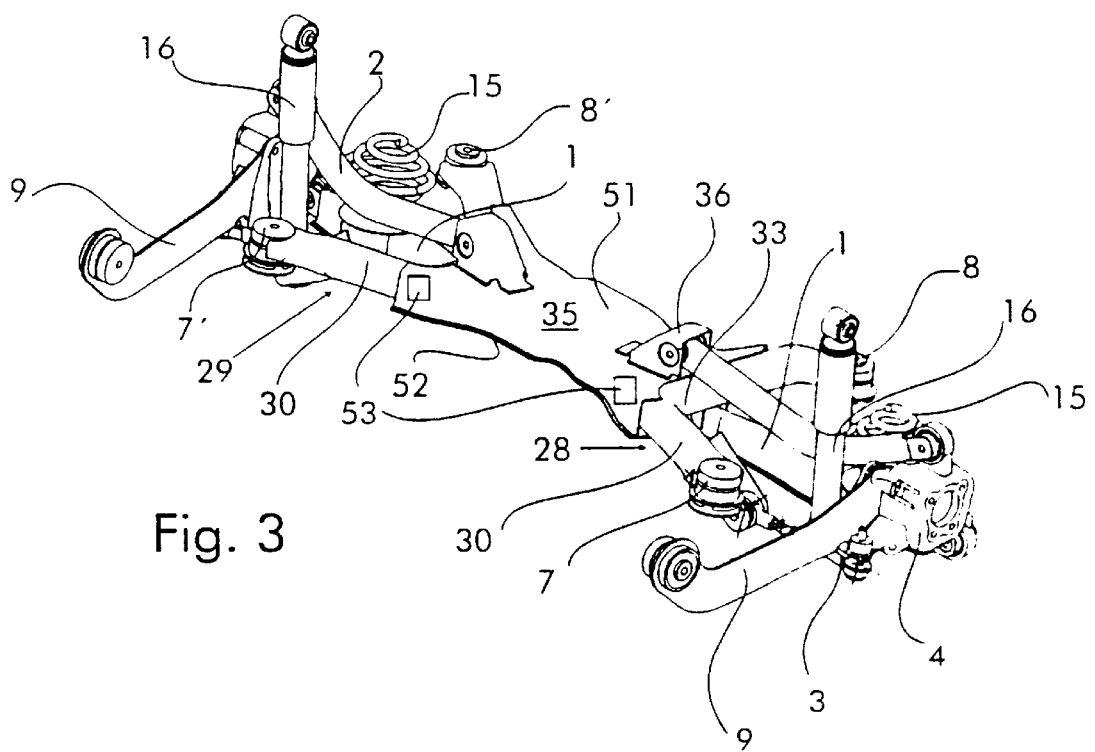

The auxiliary frame 6 whose left half is shown in FIGS. 1 and 2 and whose right half is designed inversely symmetrically to the half shown, consists of two double arms 28, 29 on each side of the vehicle. A double arm 28 (or 29) is in each case formed from a tube 30 at whose ends are provided short cylinders 31, 32 for receiving damping bushes for forming the points of attachment 7, 8. In the top view each tube 30 has roughly the shape of a U whose curved section 33 partly enters an open-ended box 35 and is welded to it. The box 35 thus forms a rigid joint between the left and right double arms 28, 29.

The box 35 has a closed cross-section and opens only at both end faces in a funnel shape in order to receive in each case the curved section 33 of the left or right double arm 28, 29. The box is slightly wider than it is high, the height being determined by the diameter of the tubes 30 used for the double arms. As can be seen from the drawing, the tubes 30 fit snugly in the open end faces and so form the side ends of the box 35.

The box 35 at the same time carries the bearing blocks 36, 37 for the link 21, 22 on the body side for the lower transverse control arm 1 and upper transverse control arm 2. The bearing block 36 for the upper transverse control arm 2 is arranged on the upper side of the box 35, and the bearing block 37 for the lower transverse control arm 1 is arranged on the lower side of the box 35. The bearing blocks can each be separate parts which are welded to the box, or parts which are constructed in one piece with the upper or lower box wall and which are formed e.g. by press-forming from the box wall. The bearing block 36 for the upper transverse control arm 2 is arranged approximately centrally, while the bearing block 37 for the lower cross member is arranged laterally to the rear, so that the side wall of the bearing block 37 merges with the rear wall of the box 35.

To keep the weight of the auxiliary frame low, it is as a whole made of aluminium. This concerns both the tubes 30 and the box 35 as well as the cylinders 30, 31 and the bearing blocks 36, 37.

On the wall of the box 35 facing forwards in the direction of travel are provided fixings 53 with guides 38 for a stabilizer 40 (only shown in FIG. 1), wherein in each case one end 54 passes under the front arm of a double arm 28 and is linked by means of a short pendulum arm to the central region of the upper transverse control arm 2.

It is also critical for the particular rigidity of the frame that in each case the central section of the U-shaped tubes 30, that is, the curved section 33, lies in mating relationship in one of the side openings of the box 35, the side end edges 50 of the upper and lower walls 51, 52 extending above and below the tube axis so that the walls merge tangentially with the tube 30. Therefore the weld seam running along the end edge 50 is almost stress-free. Seen as a whole, there is a rigid and stress-free joint between the box 35 and the tubes 30.

What is claimed is:

1. A rear wheel suspension for a vehicle body with an upper and a lower transverse control arm, a transversely arranged compensating control arm and a longitudinal control arm for multiple linking of an axle carrier to the vehicle body with a body support, consisting of a spring and a shock absorber, the lower fixing eye of the shock absorber being mounted directly on the axle carrier, the spring supported on the lower transverse control arm, wherein the upper transverse control arm is located in front of the lower transverse control arm, and wherein the lower fixing eye of the shock absorber is located approximately at the same level as a first link of the lower transverse control arm to the axle carrier.

2. A rear wheel suspension according to claim 1, wherein the compensating control arm is located in front of the shock absorber.

3. A rear wheel suspension according to claim 1 wherein the longitudinal control arm is rigidly connected to the axle carrier.

4. A rear wheel suspension according to claim 1 wherein the transverse control arms and the compensating control arm are attached to an auxiliary frame having points of attachment of the auxiliary frame for each side of the vehicle located approximately halfway between the axle carrier and the first.

5. A rear wheel suspension according to claim 4, wherein a second link of the compensating control arm is located below a front point of attachment of the auxiliary frame.

6. A rear wheel suspension according to claim 1 wherein a stabilizer extending in front of the auxiliary frame terminates at its end directly below the upper transverse control arm.

* * * * *